Dec. 16, 1952  T. A. RICH  2,622,207
RADIATION MONITORING DEVICE
Filed Aug. 11, 1951
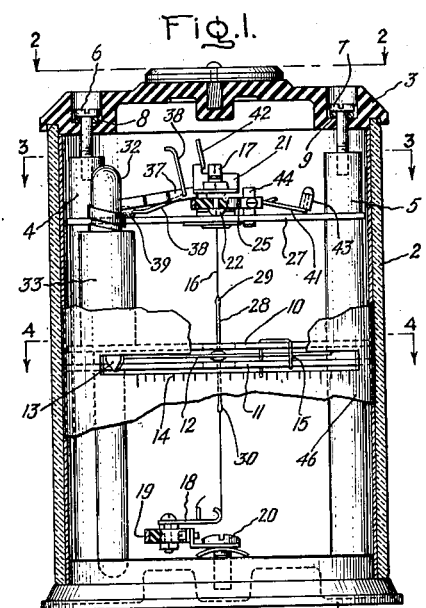
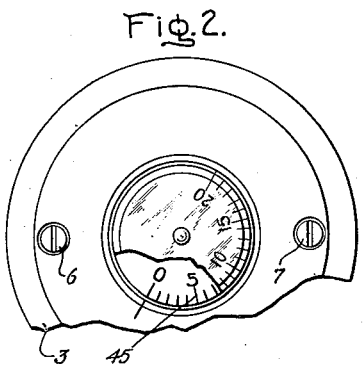
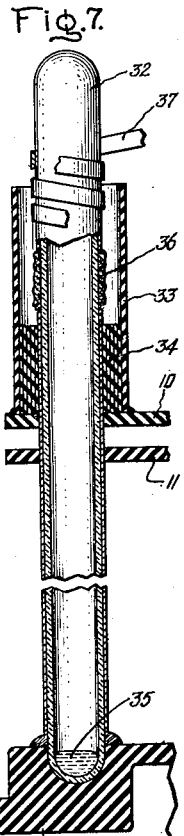
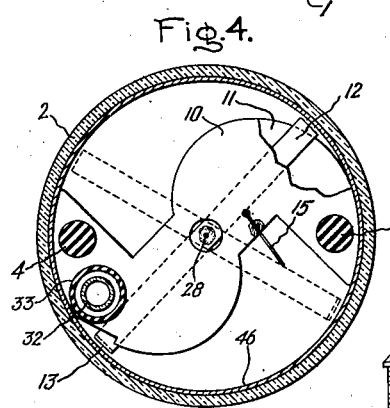
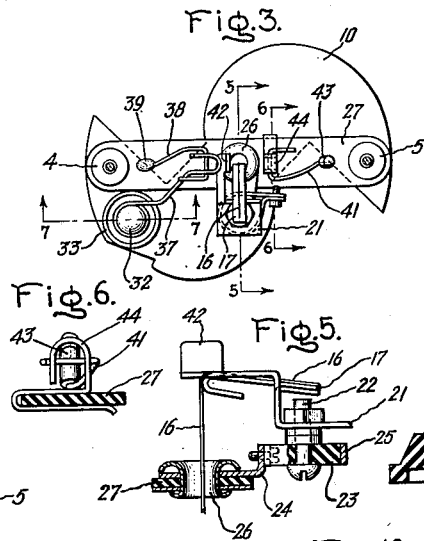
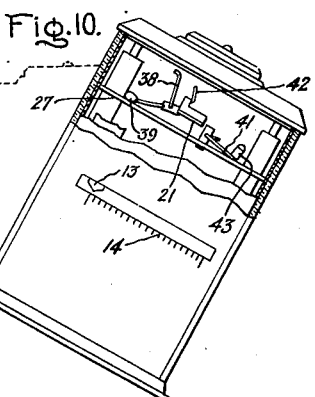
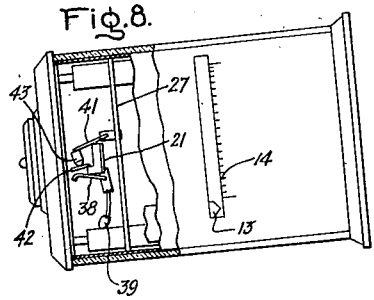
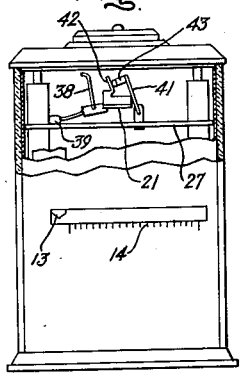
Inventor:
Theodore A. Rich,
by Paul A. Frank
His Attorney.

Patented Dec. 16, 1952

2,622,207

UNITED STATES PATENT OFFICE 2,622,207

RADIATION MONITORING DEVICE

Theodore A. Rich, Schenectady, N. Y., assignor to General Electric Company, a corporation of New York Application August 11, 1951, Serial No. 241,401

8 Claims. (Cl. 250—83.3)

The present invention comprises an electroscopic device for indicating the existence of, and measuring the amount of, radiant energy such as gamma rays and X-rays which may be harmful to life. Heretofore if a direct pointer indication was to be obtained such devices usually have required batteries; or else the reading was made by means of a microscope. Either feature is a serious disadvantage.

As a consequence of the present invention I have provided reliable devices requiring no battery or other depreciating member for indicating and measuring potentially harmful radiations by measuring the release of an electrostatic charge by radiation in air, which is by definition proportional to Roentgen units of radiation.

Another characteristic of devices embodying my invention is their simplicity of operation even in inexperienced hands which renders such devices suitable for widespread distribution for use by scientifically untrained personnel. An example is their use for the systematic plotting of reports from different points in an area regarding radiations emanating from atomic fission material which is located close enough to the given area to be potentially dangerous.

Devices embodying my invention provide an ionization chamber in which movement of an electrically charged capacitor member indicates the presence of such ion-producing radiations. These new radiation-responsive devices are rugged and particularly well adapted for general use as they are capable of being electrically charged for use without extraneous charging means and are constructed to retain an electric charge over lengthy periods of time.

As will appear from the following description, taken in connection with the accompanying drawing, an electroscopic device embodying my invention is chargeable by simply tilting the container thereby causing a mobile material to traverse a non-conducting surface; whereby an electrostatic charge is generated. Means is provided for automatically conveying a charge thus to generate an indicating electroscopic member which is deflected from a position of rest. The rate of discharge and hence the rate of ion production by radiation may be visually observed by the loss of charge as indicated by the return movement of the deflected member to the uncharged position. Additional means is provided which also is operated by a simple tilt of the apparatus for regulating the initial charge so as to set a desired initial reading in the apparatus.

These and other new results and advantages of devices embodying my invention will be further explained in connection with the accompanying drawing in which Fig. 1 is a vertical section of an electrostatic device embodying my invention; Fig. 2 is a top view; Fig. 3 is a detail view of contact making members as seen from the section 3—3 of Fig. 1 in a downward direction; Fig. 4 is a detail view of stationary and movable parts of capacity-coupled electrostatic members; Fig. 5 is a detail view of the insulating suspension of the moving member and its contact members taken along line 5—5 of Fig. 3 and revolved; Fig. 6 is a detail view of a support for a movable contact making-and-breaking switch taken along line 6—6 of Fig. 3 and revolved; Fig. 7 is a side view partly in section of a mercury-containing charging tube taken along line 7—7 of Fig. 3 and Figs. 8 to 10 inclusive illustrate the electroscopic device in the various positions to which the device is tilted in order to assume a predetermined electrostatic charge.

Referring to Fig. 1, the housing for the elements of the present electroscopic device consists of a circular base 1, cylindrical enclosure 2 and a removable circular cover plate 3. The base 1 and the cover 3 are held together in fixed relation by the vertical posts 4, 5. The cover 3 is joined to the posts 4, 5 by the screws 6, 7 which engage with the posts 4, 5. The screws are sealed into gas-tight relation with the cover 3 by the flexible gaskets 8, 9, which are pressed into recesses as shown by the screws when they are tightened. The exposed interior surfaces of the housing which contains dry air or other gas, are rendered conducting by being coated with a paint charged with lampblack, graphite, or other suitable conducting material.

Within the housing are electroscopic members, which include spaced stationary capacitor (condenser) members 10, 11 and a rotatably mounted intermediate elongated strip capacitor member 12, Figs. 1 and 4. The V-shaped end 13 of the strip member 12 which is bent at right angles to the plane of the strip 12 acts as a pointer for indicating the position of the member 12. It may be observed through a window in the paper lining 14 on the outside of which a scale is marked as shown. The interior surface of the lining 14 may be coated with conducting paint. The cylinder 2 preferably consists of transparent material such, for example, as an acrylic resin.

The position of the pointer 13 indicates the state of charge of the capacity-related members 10—11 and 12. When fully charged the movable member 12 seeks a position in which it lies within the space covered by the stationary plates 10, 11. When the charge is dissipated in any way the rotatable strip emerges from the space between the stationary plates 10, 11 until, as shown in dotted outline, Fig. 4, it is substantially at right angles to its original position of being charged. The motion of the rotatably movable member 12 is finally arrested by the stop 15.

The movable strip member 12 is suspended by a conducting filamentary torsional support 16 from an upper bracket 17 (Fig. 5). The lower end of the supporting filament 16 is connected to the bent end of a plate-shaped bracket 18 which is mounted by an insulated strap 19 on the base 1 by a screw 20. The upper bracket 17 (Fig. 5) is mounted on a notched plate 21 which in turn is mounted on a screw-threaded post 22. The latter is electrically insulated by a disk 23 of high grade insulation, such as polystyrene and is supported by a bracket 24 which provides a circular clamp 25 surrounding the insulator 23. The bracket 24 is attached by a perforated rivet 26 to a strap 27 which extends between the vertical parts 4, 5, Fig. 1. The drawing shows a torsional support such as commonly used galvanometers represented by the vertical filament 16 which consists of a suitable alloy. A tubular stem 28 which is slipped over the filament 16 and is connected thereto by conducting cement at opposite ends as indicated at 29, 30 reenforces the filament. The tubular stem 28 may consist of aluminum.

Vertically supported within the housing from the base 1 and the stationary plates 10, 11 is a gravity operated, electromagnetic electrostatic charging apparatus that includes an insulating sealed tube 32 consisting of glass. The glass tube 32 is partly surrounded by an outer open insulating tube 33 which in turn is supported by the stationary plates 10, 11. A spacer 34 of any suitable insulating material fills part of the space between the tube 32 and the outer tube 33. Within the tube 32, which is evacuated, is a small quantity 35 of mercury. The upper part of the tube 32 and the other exposed surfaces are coated with a conducting paint except for an intermediate surface of the tube 32 at 36 which is coated with insulating material as indicated. The insulating coat 36 may consist of a high melting wax, or other material chosen to be a better insulator than glass under conditions of high humidity. When the device is tilted (as will be explained in connection with Fig. 8) the mercury flows over the inner surface of the glass tube 32 thereby charging the upper end which is insulated by the section 36, to a voltage of several hundred volts or higher. Many materials other than mercury can be used as the charge-generating movable member in the tube 32. Fine granular nonconducting materials, even ordinary sugar, can be used in place of mercury. Nor is a vacuum essential but is preferred as a vacuum gives consistent results.

Connected to the upper conductively coated end of the tube 32 is a strip conductor 37 which terminates in a movable bent wire gravity-operated switch 38. One end of this switch is a wire which normally is in a nearly upright position but leaning somewhat toward the left of the drawing that is toward the tube 32. This wire is pivotally mounted on the supporting strip 37, Fig. 3. The opposite of the movably mounted bent wire 38 is provided with a weight 39 which normally rests on the strap 27 extending between the posts 4, 5. By tilting the entire device, the gravity-operated switch 38 may be caused to connect the charged end of the tube 32 either to the plate 21, and thereby to the conducting filamentary support 16 which leads to the movable electroscope member 12. When the device is restored to the normal upright position shown in Fig. 9 the weight 39 causes the contact member 38 to leave the plate 21. The weighted end of wire 38 contacts with the strap 27, Figs. 1, 9 and 10 and thus discharges to the conductive interior surfaces whatever charge may remain in the mercury tube.

As the electrostatic charge which thus is imparted to the movable indicating member 12 may be so high as to cause its pointer 13 to move to the left of the zero point of the scale 14 as indicated in Fig. 9, it may be desirable to cause some of the charge to be dissipated. For this purpose a leakage path is provided namely through a switch 41 which automatically engages with the projection 42 of the plate 21. The switch 41 includes a high resistance member 43 which may be a glass having sufficient conductivity to carry away some of the charge to ground here represented by the conductivity coated strap 27 and connected parts. As shown in Fig. 6 the switch 41 is hinged to a looped support 44 which makes electrical contact with strap 27.

When the charge has reached a desired value either zero or some predetermined reading on the scale 14, the leakage path through the switch 41 is opened by tilting the device in a direction which is opposite to the charging tilt. As shown in Fig. 10 the leakage switch 41 falls away from the projection 42 in this position.

Assuming the indicator 13 to have been set at a zero position which corresponds to a charge of perhaps 400 volts on the electrometer elements, the monitor will under ordinary conditions hold a substantial part of this charge for several days in the absence of radiation. When radiations capable of producing ionization traverse the space within the housing, the rate of discharge is accelerated. By observing the rate of change of the charge, through the rate of motion of the indicator over the scale 14, the existence and relative strength of the radiations may be noted. A measure of the total integrated radiation during a given interval in milliroentgen units is equal to the difference between the initial and final reading.

In some cases the reading of the monitor device at the beginning of a given period may be noted for future comparison purposes by setting the manually adjustable scale 45 in the top of the device. When another reading is taken at a later time, the difference can be noted from the scale 45 thus giving the radiation during the interval.

What I claim as new and desire to secure by Letters Patent of the United States is:

1. A device for indicating and measuring radiations which are productive of ionization comprising the combination of a sealed gas-filled enclosure, cooperating capacitor members therein one of which is torsionally supported, a gravity operated electrostatic charging apparatus supported within said enclosure for charging said members, switching means for connecting and disconnecting one of said capacitor members to and from said charging means, said switching means being automatically operated to connect and disconnect one of said capacitor members to said charging means in response to a charge-developing operation and means indicating the position of said pivotally-supported capacitor member when in a charged state.

2. A radiation detecting device, comprising the combination of a container, a charge of gas therein, cooperating capacitor members therein one of which is movable and another of which is stationary, a filamentary torsional support for said movable member permitting motion thereof in a plane substantially parallel to said stationary member, a sealed tube of glass containing a mobile material located in said enclosure, whereby an electrostatic charge may be generated by the movement of said material over the interior tube surface when said container is tilted, a gravity-operated switch which is operable automatically by the tilting of said container whereby such charge is transferred at least in part from said charge-generating tube to one of said capacitor members and indicating means whereby a relative condition of charge of said capacitor members may be determined.

3. A radiation monitor comprising the combination of a hollow container having an electrically conducting interior lining, spaced capacitor members therein, one of which is torsionally supported, indicating means for determining the displacement of said rotatable member, an electrostatic charger actuated by tilting for electrostatically charging said members, a circuit containing a gravity-actuated switch actuated by tilting for causing said capacitor members to be connected to and disconnected from said charger, a second circuit providing a high resistance discharge path for said members and a second gravity-actuated switch operable by tilting of said container for closing and opening for said second circuit whereby a chosen charge condition of said members may be attained as a comparison value for subsequent discharge caused by the ionizing effect of radiations.

4. A radiation indicator comprising the combination of an air-filled container consisting of non-conducting material, spaced air capacitor members mounted therein, one of which is torsionally mounted to be deflectable from a position of rest, means for indicating displacement of said deflectable capacitor member, means actuated by tilting for electrostatically charging said capacitor members whereby deflection occurs of said deflectable member, circuit connections including a gravity-actuated switch for causing said capacitor members to be charged by being successively connected to and disconnected from said charging means, and means for indicating the return movement of said deflected capacitor member due to loss of charge.

5. An instrument for indicating and measuring ionizing radiations including in combination a housing defining an ionization chamber, an electrostatic charge measuring device secured within said ionization chamber, a gravity operated electromechanical charging apparatus mounted on said housing, and selectively movable switching means supported by said housing for selectively connecting the output of said charging apparatus to said electrostatic charge measuring device for charging the same to a desired electric potential.

6. An instrument for indicating and measuring ionizing radiations including in combination a housing defining an ionization chamber, an electrometer measuring device secured within said ionization chamber, and having the movable element thereof observable through the housing walls, gravity operated electrostatic charging apparatus mounted within said housing, and movable switching means supported within said housing for selectively connecting the output of said electrostatic charging apparatus to said electrometer measuring device for charging the same to a desired electric potential.

7. An instrument for indicating and measuring ionizing radiations including in combination a housing having walls with conductive inner surfaces and defining an ionization chamber, an ionizable gas disposed within such chamber, an electrometer measuring device secured within said ionization chamber and having the movable element thereof observable through an opening in the conductive surfaces of the housing walls, a gravity operated electrostatic charging apparatus mounted within said ionization chamber, first movable switching means supported within said ionization chamber for selectively connecting the output of said electrostatic charging apparatus to said electrometer measuring device for charging the same to a desired electric potential, and second movable switching means supported within said ionization chamber for selectively connecting the electrometer measuring device to the conductive walls of said housing to thereby control the amount of electric charge imparted to said electrometer device.

8. An instrument for indicating and measuring ionizing radiations including in combination a housing having walls with conductive inner surfaces and defining an ionization chamber, an ionizable gas disposed with such chamber, an electrometer measuring device secured within said ionization chamber and having the movable element thereof observable through an opening in the conductive surface of the housing walls, a gravity operated electrostatic charging apparatus comprising a glass tube with a globule of mercury slidably supported therein, said apparatus being disposed within said housing, a first gravity operated electric switch mounted within said ionization chamber for selectively connecting the output of said electrostatic charging apparatus to said electrometer measuring device for charging the same to a desired electric potential, and a second, gravity operated electric switch mounted within said ionization chamber for selectively connecting the electrometer measuring device to the conductive walls of said housing to thereby control the amount of electric charge imparted to said electrometer device.

THEODORE A. RICH.

REFERENCES CITED

The following references are of record in the file of this patent:

UNITED STATES PATENTS

| Number | Name | Date |
| --- | --- | --- |
| 1,927,548 | Hopfield | Sept. 19, 1933 |
| 2,587,254 | Victoreen | Feb. 26, 1952 |